United States Patent
Petrie et al.

(10) Patent No.: US 11,996,206 B2
(45) Date of Patent: May 28, 2024

(54) 3D PRINTED FEATURES ON NUCLEAR FUEL CLADDING FOR OPTIMIZED HEAT TRANSFER

(71) Applicant: UT-Battelle, LLC, Oak Ridge, TN (US)

(72) Inventors: Christian M. Petrie, Oak Ridge, TN (US); Phillip C. Chesser, Oak Ridge, TN (US); Benjamin R. Betzler, Oak Ridge, TN (US); Ryan R. Dehoff, Oak Ridge, TN (US); Kevin G. Field, Oak Ridge, TN (US); Kurt A. Terrani, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/728,327

(22) Filed: Apr. 25, 2022

(65) Prior Publication Data
US 2022/0359094 A1 Nov. 10, 2022

Related U.S. Application Data

(60) Provisional application No. 63/185,384, filed on May 7, 2021.

(51) Int. Cl.
*G21C 3/20* (2006.01)
*G21C 3/07* (2006.01)
(Continued)

(52) U.S. Cl.
CPC .......... *G21C 3/20* (2013.01); *G21C 3/07* (2013.01); *G21C 3/08* (2013.01); *G21C 15/06* (2013.01)

(58) Field of Classification Search
CPC ... G21C 3/08; G21C 3/18; G21C 3/20; G21C 15/16; G21C 15/28; G21C 15/06; G21C 5/00
(Continued)

(56) References Cited

U.S. PATENT DOCUMENTS 2,902,422 A * 9/1959 Hutter ...................... G21C 3/34
376/454
3,104,219 A * 9/1963 Sulzer ..................... G21C 3/326
376/454
(Continued)

FOREIGN PATENT DOCUMENTS

EP 0534254 A1 * 3/1993 ............. G21C 3/344

OTHER PUBLICATIONS

Betzler, B. R., B. J. Ade, et al. 2020. "Design Downselection for the Transformational Challenge Reactor." Trans. Am. Nucl. Soc. 122.
(Continued)

*Primary Examiner* — Jack W Keith
*Assistant Examiner* — Daniel Wasil
(74) *Attorney, Agent, or Firm* — WARNER NORCROSS + JUDD LLP

(57) ABSTRACT

A nuclear fuel cladding with improved thermomechanical properties is provided. The nuclear fuel cladding includes a double-walled construction having inner and outer hexagonal sidewalls. The inner sidewall and the outer sidewall are spaced apart from each other to form a cooling channel therebetween, and the inner sidewall surrounds a nuclear fuel and is spaced apart from the nuclear fuel by a small gap. Helical fins extend into the cooling channel to interconnect the inner sidewall and the outer sidewall. Resilient fingers extend toward the nuclear fuel through the small gap to comply with variations in the size of the nuclear fuel due to fabrication tolerances as well as thermal expansion and
(Continued)

swelling of the nuclear fuel, for example $UO_2$, when undergoing fission. The nuclear fuel cladding is formed according to an additive manufacturing process, for example laser powder bed fusion printing.

9 Claims, 6 Drawing Sheets

(51) Int. Cl.
  *G21C 3/08* (2006.01)
  *G21C 15/06* (2006.01)
(58) Field of Classification Search
  USPC .................................................. 376/453, 454
  See application file for complete search history.

(56) References Cited

U.S. PATENT DOCUMENTS

| | | | | |
|---|---|---|---|---|
| 3,262,860 | A * | 7/1966 | Zebroski | G21C 3/06 |
| | | | | 376/454 |
| 3,969,186 | A * | 7/1976 | Thompson | G21C 3/20 |
| | | | | 376/418 |
| 4,324,618 | A * | 4/1982 | Schluderberg | G21C 3/338 |
| | | | | 376/454 |
| 9,837,174 | B2 * | 12/2017 | Mazaudier | G21C 3/60 |
| 2008/0084957 | A1 * | 4/2008 | Aleshin | G21C 3/332 |
| | | | | 376/178 |
| 2018/0226159 | A1 * | 8/2018 | Sterbentz | G21C 3/626 |

OTHER PUBLICATIONS

Terrani, Kurt A., Brian C. Jolly, and Jason M. Harp. 2020. "Uranium Nitride Tristructural-Isotropic Fuel Particle." Journal of Nuclear Materials 531: 152034.

Terrani, Kurt, Brian Jolly, and Michael Trammell. 2020. "3D Printing of High-Purity Silicon Carbide." Journal of the American Ceramic Society 103 (3): 1575-1581.

Dehart, Mark D., and Stephen M. Bowman. 2011. "Reactor Physics Methods and Analysis Capabilities in SCALE." Nuclear Technology 174 (2): 196-213.

Pappano, P. J., T. D. Burchell, et al. 2008. "A Novel Approach to Fabricating Fuel Compacts for the Next Generation Nuclear Plant (NGNP)." Journal of Nuclear Materials 381 (1): 25-38.

Lu, Cihang, and Nicholas R. Brown. 2019. "Fully Ceramic Microencapsulated Fuel in Prismatic High-Temperature Gas-Cooled Reactors: Design Basis Accidents and Fuel Cycle Cost." Nuclear Engineering and Design 347: 108-121.

Shapiro, Rachel A., and Massimiliano Fratoni. 2016. "Assembly Design of Pressurized Water Reactors with Fully Ceramic Microencapsulated Fuel." Nuclear Technology 194 (1): 15-27.

Terrani, K. A., J. O. Kiggans, et al. 2012. "Fabrication and Characterization of Fully Ceramic Microencapsulated Fuels." Journal of Nuclear Materials 426 (1): 268-276.

Tsong-Pyng, Perng, and C. J. Altstetter. 1986. "Effects of Deformation on Hydrogen Permeation in Austenitic Stainless Steels." Acta Metallurgica 34 (9): 1771-1781.

* cited by examiner

3D PRINTED FEATURES ON NUCLEAR FUEL CLADDING FOR OPTIMIZED HEAT TRANSFER

CROSS-REFERENCE TO RELATED APPLICATIONS

This application claims the benefit of U.S. Provisional Application 63/185,384, filed May 7, 2021, which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to nuclear fuel cladding with improved heat transfer properties.

BACKGROUND OF THE INVENTION

Nuclear fuel cladding forms the outer barrier of a nuclear fuel element and allows for the transfer of fission heat to the surrounding coolant without the release of fission products. Fuel cladding for light-water reactors typically includes a zirconium tube that is sealed at each end. Similarly, sodium-cooled fast reactors typically use sealed ferritic/martensitic steel tubes. In either case, the tube manufacturing process (e.g., drawing, swaging, pilgering) limits the geometry of the nuclear fuel cladding to a simple cylindrical tube or other radially symmetric tube, for example a square tube or a hexagonal tube, with smooth inner and outer surfaces. The nuclear fuel (i.e., fissile material) is then inserted into the tube as fuel pellets, for example ceramic pellets for light water reactors, or metal fuels for sodium-cooled fast reactors.

The gap between the nuclear fuel and the cladding is often filled with gas, for example He in light-water reactors, or liquid metal, for example Na in sodium-cooled fast reactors. The medium used between the nuclear fuel and the cladding aids in the transfer of heat from the nuclear fuel to the cladding. FIG. 1 shows the process of heat transfer from a nuclear fuel to a thermal fluid (a moving coolant) when encapsulated within a metal tube. In particular, $J_{1-4}$ in FIG. 1 designates the direction of heat flux via (1) conduction inside the fuel, (2) conduction, with negligible amounts of radiation and convention, across the medium-filled gap, (3) conduction across the cladding wall, and (4) convention to the flowing coolant, respectively. When the gap is filled with gas, as it often is, a large temperature gradient results because of $J_2$ due to the poor thermal conductivity of the gas, e.g., roughly two orders of magnitude lower than a solid or a liquid. This large temperature drop results in high fuel temperatures and drives thermally-activated processes (e.g., constituent migration, diffusion, or fission gas release), which degrades the fuel performance. For $J_4$, a boundary layer is often present between the surface of the cladding and the bulk coolant. The smooth outer surfaces of the fuel cladding can limit mixing and heat transfer across the thermal boundary layer.

Additionally, the fluid-filled gap between the nuclear fuel and the cladding is typically very thin, on the order of tens to hundreds of micrometers, to reduce the temperature drop resulting from the low thermal conductivity of the gas. However, the combination of outward fuel swelling and inward cladding creep during reactor operation causes this gap to dynamically change over time. If not sized properly, fuel pellet-cladding interactions can cause failure of the fuel element. Cladding failure is a significant issue and may require reactor shutdown and an unplanned refueling. A single fuel failure in modern light-water reactors can cost a utility between $1 MM and $20 MM, for example. Therefore, strict dimensional tolerances are needed for the fuel and cladding, which in turn require expensive machining operations.

SUMMARY OF THE INVENTION

A nuclear fuel cladding with improved thermomechanical properties is provided. The nuclear fuel cladding greatly improves thermal conductivity across $J_2$ and $J_4$ while offering additional benefits for structural integrity. For example, the temperature gradient across $J_2$ is reduced by incorporating mechanically compliant structures that create a direct heat conduction path from the nuclear fuel to the cladding. Also by example, the temperature gradient across $J_4$ is reduced by incorporating structures that interact with the flowing coolant and enhance the mixing of the flowing coolant. The foregoing structures are integrally formed with the cladding according to additive manufacturing techniques, for example laser powder bed fusion 3D printing, which greatly simplifies the manufacture of metal cladding having complex geometries.

In one embodiment, the nuclear fuel cladding includes a double-walled construction having inner and outer hexagonal sidewalls. Other geometries (e.g., rectangular or octagonal sidewalls) can be used in other embodiments. The inner sidewall and the outer sidewall are spaced apart from each other to form a cooling channel therebetween. The inner sidewall surrounds the nuclear fuel and is spaced apart from the nuclear fuel by a small gap. First structures extend into the cooling channel to interconnect the inner sidewall and the outer sidewall, and second structures extend toward the nuclear fuel through the gap. The second structures are allowed to deform elastically and/or plastically to comply with variations in the size of the nuclear fuel during manufacturing as well as changes in dimensions due to thermal expansion, swelling, or other phenomena. The first structures are optionally helical fins, and the second structures are optionally resilient fingers, fins, or knobs that extend toward the nuclear fuel. The cladding is optionally formed using either single materials, such as Type 304 stainless steel or Type 316 stainless steel, or multi-material systems wherein the overall structure and design can be aided through the use of additive manufacturing techniques such as laser powder bed fusion printing or direct metal deposition. In some embodiments, two or more features of the cladding are formed from different metal alloys. For example, the outer hexagonal wall, and optionally the inner hexagonal wall, can be formed from stainless steel, while the second structures are formed from a ductile but thermally conductive metal such as copper. Further optionally, the inner and outer hexagonal walls and the first structures are formed from a first metal, for example stainless steel, and the second structures are formed from a ductile but thermally conductive metal such as copper.

These and other features of the invention will be more fully understood and appreciated by reference to the description of the embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

As discussed herein, the current embodiments include a double-walled cladding structure that is additively manufactured using laser powder bed fusion. The cladding structure contains internal spring mechanisms to enhance heat transfer and to accommodate variable fuel dimensions as well as fuel thermal expansion and irradiation-induced swelling. The flow of coolant through the double-walled cladding structure can be optimized radially and axially via interconnecting fins, thereby yielding uniform coolant outlet temperature distributions. The rigid, double-walled cladding structure also establishes a fixed cooling channel that is independent of the surrounding fuel elements. Compared to conventional reactors in which the cooling channel is established between multiple adjacent fuel elements and depends on the fit-up of the entire reactor core, the uncertainties in the coolant channel geometry in the present invention are greatly reduced.

Figure 1:
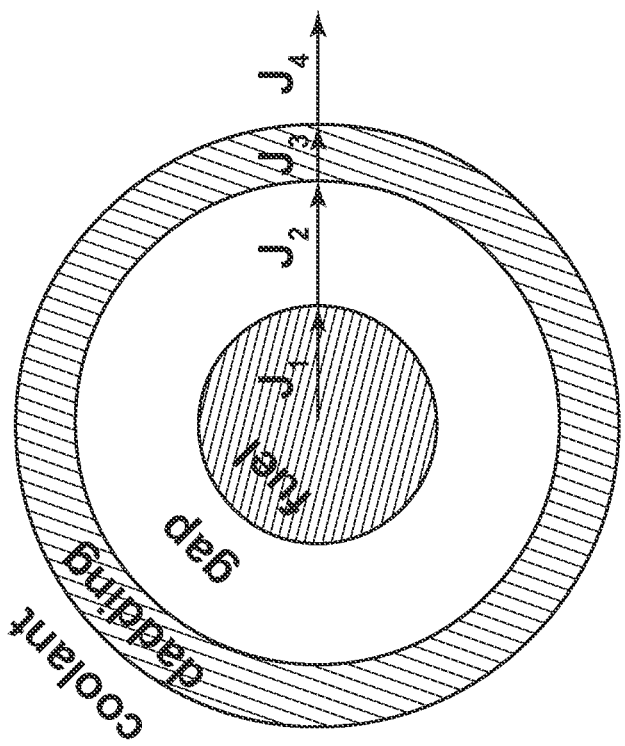
FIG. 1 illustrates heat transfer from a nuclear fuel to a thermal fluid (a moving coolant).
Figure 2:
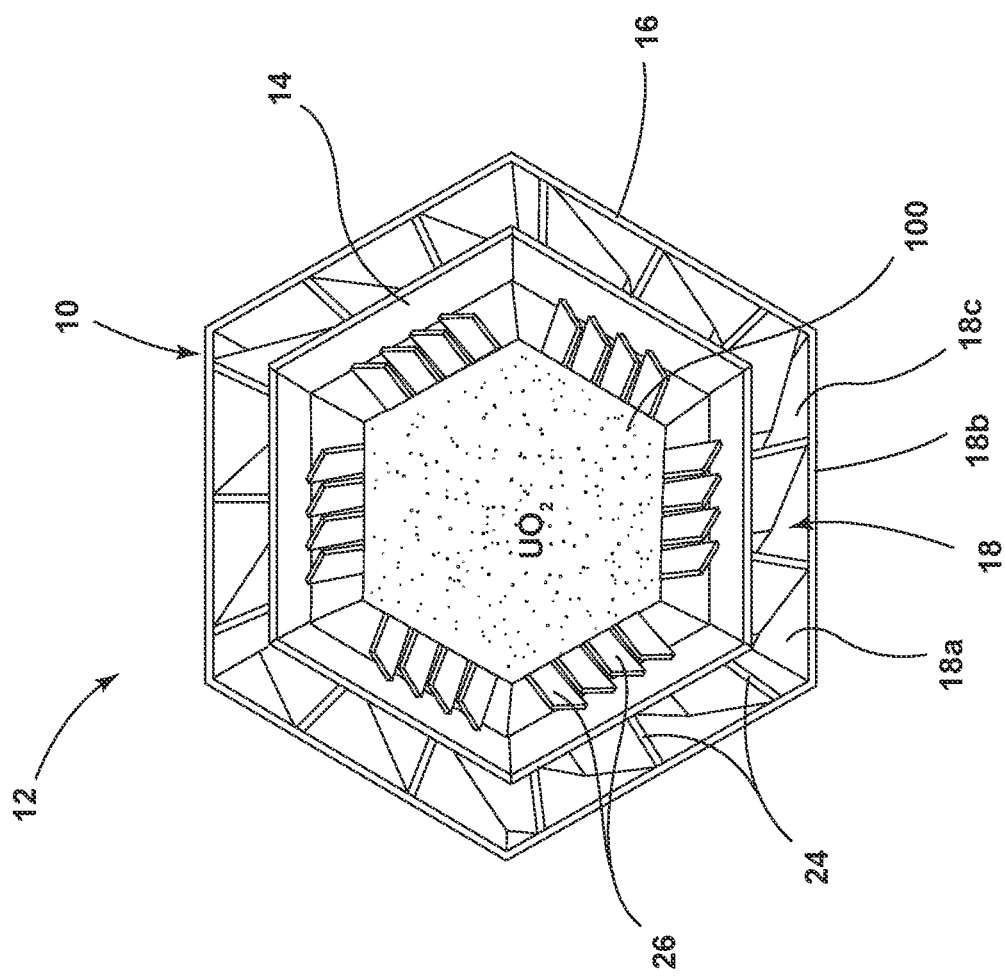
FIG. 2 is a top-down view of a fuel can including a double-walled cladding and a nuclear fuel.
Figure 3:
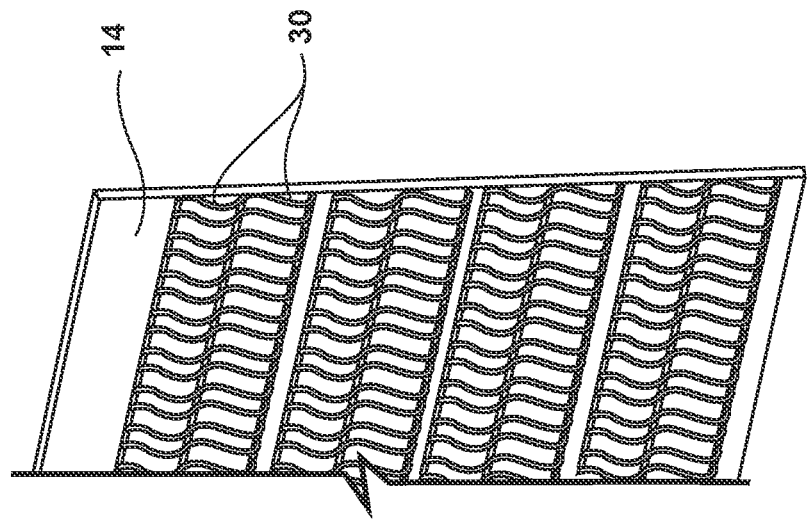
FIG. 3 illustrates a portion of the double-walled cladding as including knobs or resilient fingers.
Figure 3:
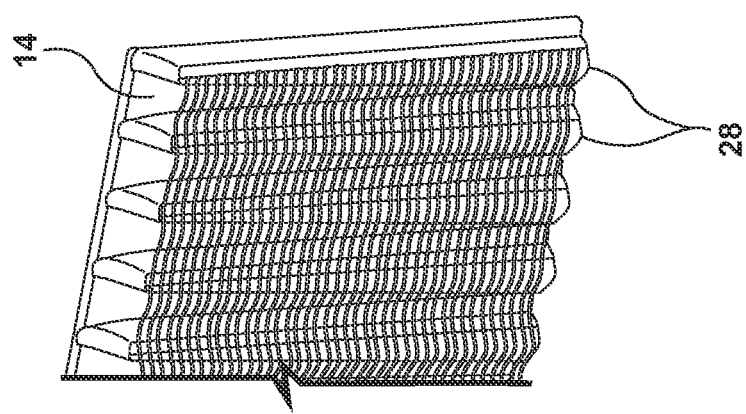
Figure 4:
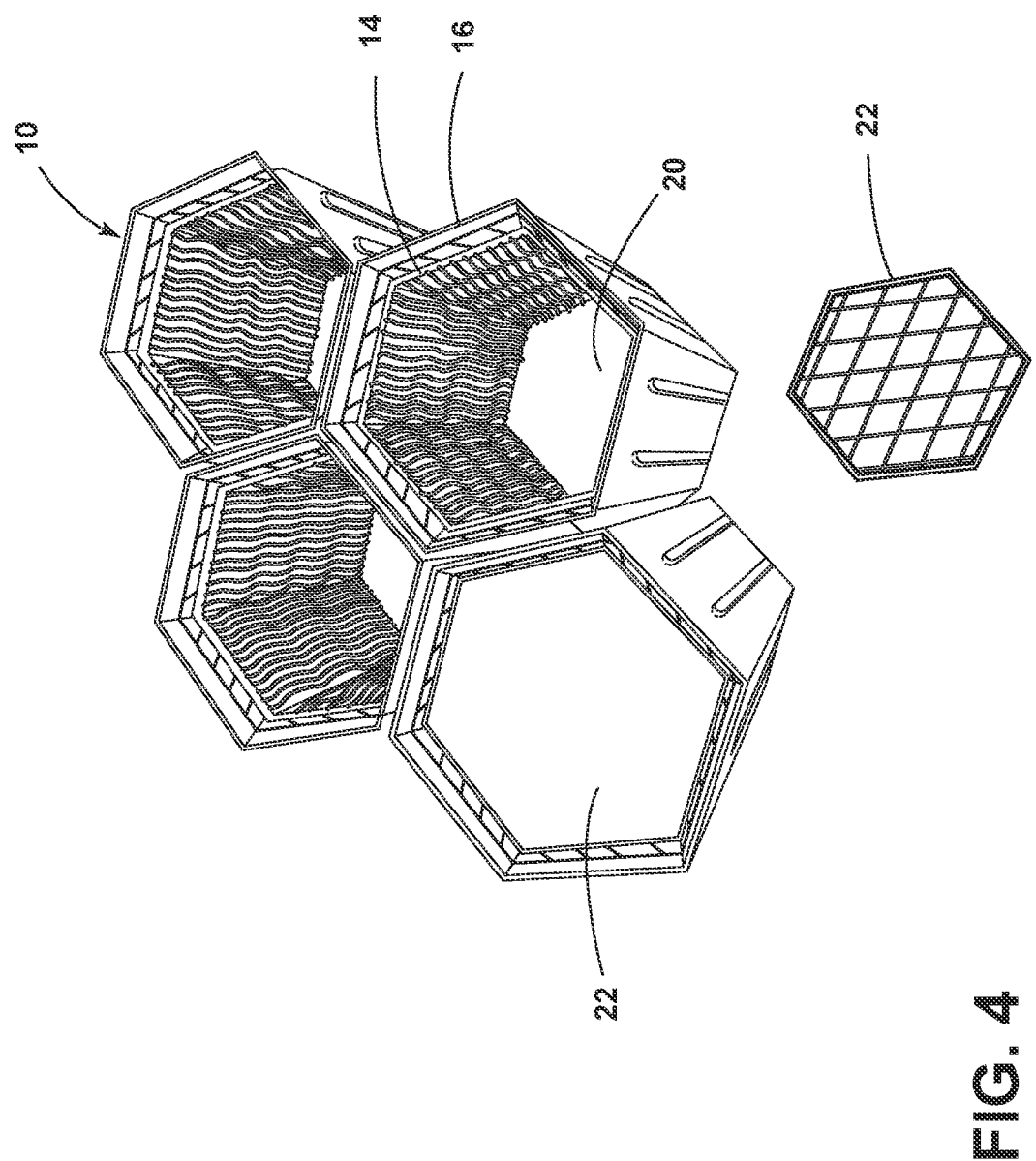
FIG. 4 illustrates multiple fuel cans including a double-walled cladding in a side-by-side relationship.

Referring now to FIGS. 2-4, a double-walled cladding structure for a nuclear fuel 100 is illustrated and generally designated 10. Collectively, the cladding structure 10 and the nuclear fuel 100 comprise a fuel can 12 (i.e., a nuclear fuel element) for a nuclear reactor. The cladding structure 10 includes an inner sidewall 14 that is spaced apart from an outer sidewall 16 to form a cooling channel 18 therebetween. The inner and outer sidewalls 14, 16 are hexagonal in the illustrated embodiment, primarily because a hexagon is mathematically optimum for enclosing an area with a repeating lattice structure and is infinitely repeatable. However, other constructions are possible in other embodiments, including cylindrical tubes, rectangular tubes, or any other construction including those that are axially and/or radially asymmetric. The cladding structure 10 also includes an integral base 20 and a separate lid 22 (visible in FIG. 4), the lid 22 being welded to the upper periphery of the inner sidewall 14.

The inner sidewall 14, the base 20, and the lid 22 define an internal fuel cavity for the nuclear fuel 100. In addition, the cladding structure 10 includes a plurality of first structures that interconnect the inner sidewall 14 and the outer wall 16. The plurality of first structures comprise a plurality of fins 24 that sub-divide the cooling channel 18 into multiple sub-channels 18a, 18b, 18c, etc., such that n number of fins creates n number of sub-channels. The illustrated embodiment includes fifteen fins and fifteen sub-channels, however greater or fewer number of fins and sub-channels can be used in other embodiments. The fins 24 extend from the lower periphery of the double-walled cladding structure 10 to the upper periphery of the double-walled cladding structure 10. The cooling channel 18 extends entirely through the cladding structure 10, being open at upper and lower ends of the cladding structure 10 for circulation of the coolant therethrough. The fins 24 are non-linear or curvilinear and are oriented at a non-zero angle relative to vertical to direct the cooling gas through the sub-channels at a non-zero angle relative to vertical, thereby promoting radial and axial movement of the coolant.

The cladding structure 10 also includes a plurality of second structures that extend radially inward, toward the nuclear fuel 12. The plurality of second structures can include essentially any geometry that enhances heat transfer from the nuclear fuel 12 and that accommodates a wide range of as-fabricated fuel dimensions as well as thermal expansion and irradiation-induced swelling of the nuclear fuel 12. As show in FIG. 2, for example, each inward-facing surface of the inner sidewall 14 includes four vertical fins 26. Along their major axis, the vertical fins 26 extend along a substantial portion of the height of the inner sidewall 14. Along their minor axis, the vertical fins 26 are angled at a non-zero angle (e.g., 12 degrees) relative to the inner sidewall 14. As the nuclear fuel 100 expands, the fins 26 flex toward the inner sidewall 14, reducing to a lesser angle (e.g., 6 degrees). The vertical fins 26 remain in contact with the nuclear fuel 100 at all times, thus providing improved thermal conductivity (and a lesser thermal gradient) across the gas-filled gap between the nuclear fuel 100 and the inner sidewall 14. The fins 26 are oriented vertically in the illustrated embodiment, but can be oriented horizontally or at a non-zero angle relative to horizontal in other embodiments.

The plurality of second structures can alternatively include knobs or resiliently deformable fingers. As shown in FIG. 3 for example, each inward-facing surface of the inner sidewall 14 can include five vertical knobs 28 or eight horizontal rows of resiliently deformable fingers 30. Akin to the angled fins 26 illustrated in FIG. 2, the vertical knobs 28 and the resiliently deformable fingers 30 remain in contact with the nuclear fuel 100 at all times, thus providing improved thermal conductivity (and a lesser thermal gradient) across the gap between the nuclear fuel 100 and the inner sidewall 14.

Figure 5:
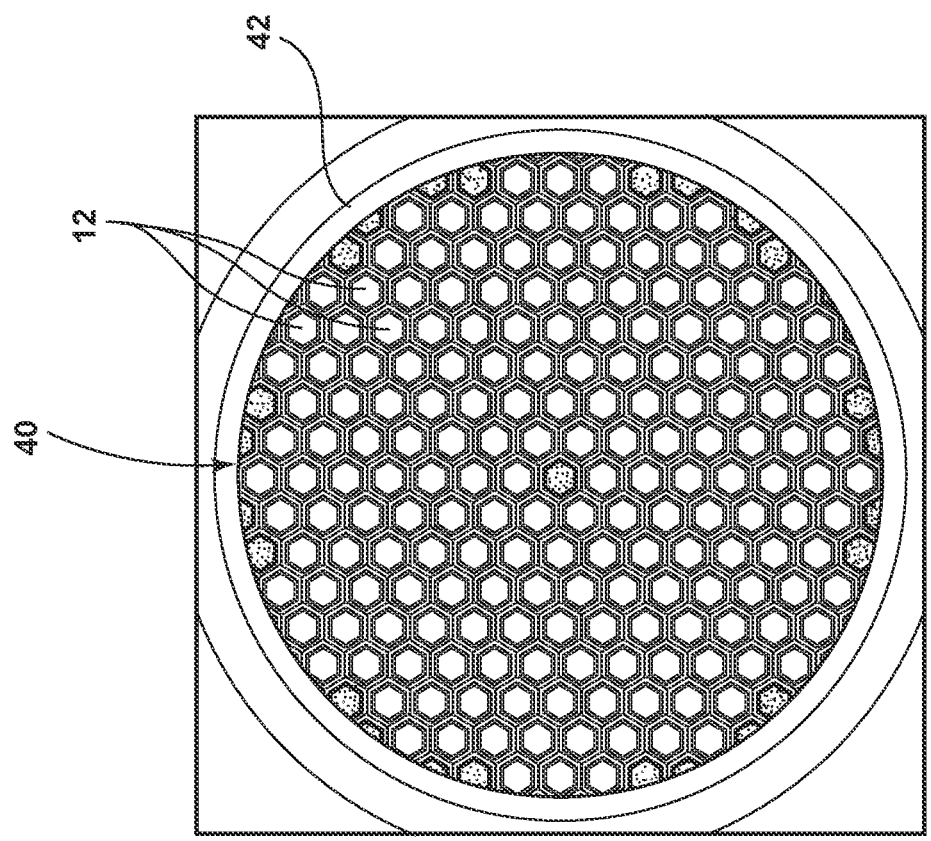
FIG. 5 illustrates a nuclear fuel module including a plurality of adjacent hexagonal fuel cans.

In the illustrated embodiment, each cladding structure 10 comprises a fuel can 12 that is 4 cm wide (flat-to-flat width) and 10 cm in length. The fuel cans 12 are oriented side-by-side and are stacked upon one another to form a core module. As illustrated in FIG. 5, for example, the core module 40 is approximately 80 cm in diameter with an active fuel length of about 100 cm and is surrounded by a barrel 42. The thickness of the inner sidewall 14 and the outer sidewall 16 is 0.5 mm, and the thickness of the flow channel 18 is 0.4 cm. The core module 40 can include a moderator material, for example yttrium hydride or zirconium hydride.

A manufacturing method according to one embodiment includes laser powder bed printing the cladding structure, wherein the cladding structure is formed from Type 304 or Type 316 stainless steel. Specifically, a powder feedstock is deposited in sequential layers, one on top of the other. Following the deposit of each layer of powder feedstock, a fiber optic laser fuses the powder feedstock together in accordance with a computer model (e.g., CAD model) of the cladding structure. The laser powder bed printing process allows geometrical complexity, particularly for the first and second structures of the cladding structure, that are not possible using conventional manufacturing techniques. Once the cladding structure is fully printed, the unbound powder is removed, yielding for example the near net-shaped cladding structure shown in FIG. 4. Post processing steps can include heat treatments, machining steps, and polish processes.

Alternative manufacturing methods include direct metal deposition and binder jet printing to allow the use of different metal alloys. For example, two or more features of the cladding structure can be additively manufactured from different metal alloys according to a direct metal deposition method. As one example, the outer hexagonal wall, and optionally the inner hexagonal wall and the first structures, can be formed from stainless steel, while the second structures can be formed from a ductile but thermally conductive metal such as copper. As another example, the inner and outer hexagonal walls and the first structures can be formed from a first metal, for example stainless steel, and the second structures can be formed from a ductile but thermally conductive metal such as copper. Other combinations of metals and metal alloys can be used in other embodiments as desired.

Subsequent to the formation of the cladding structure, nuclear fuel is added to the internal fuel cavity. The nuclear fuel can include uranium, plutonium, thorium, or other fissile elements, and can be ceramic pellets, bare fuel kernels or coated particles, for example tri-structural isotropic (TRISO) particles, bi-structural isotropic (BISO) particles, and bare uranium-bearing (e.g., $UO_2$, UC, UN, or there combinations) spheres (fuel kernels) containing fissile uranium. The internal fuel cavity is then sealed by welding the lid 22 to the inner sidewall 14. The resultant fuel can 12 includes a generally stackable construction. When arranged and stacked, the cooling channel(s) 18 of each fuel can 12 are in fluid communication with the cooling channel(s) 18 of a vertically adjacent fuel can 12. Further, the cooling channels 18 can be manufactured with surface features to improve cooling of the nuclear fuel therein, as the thermal energy is optimally transmitted to the cooling fluid.

Figure 6:
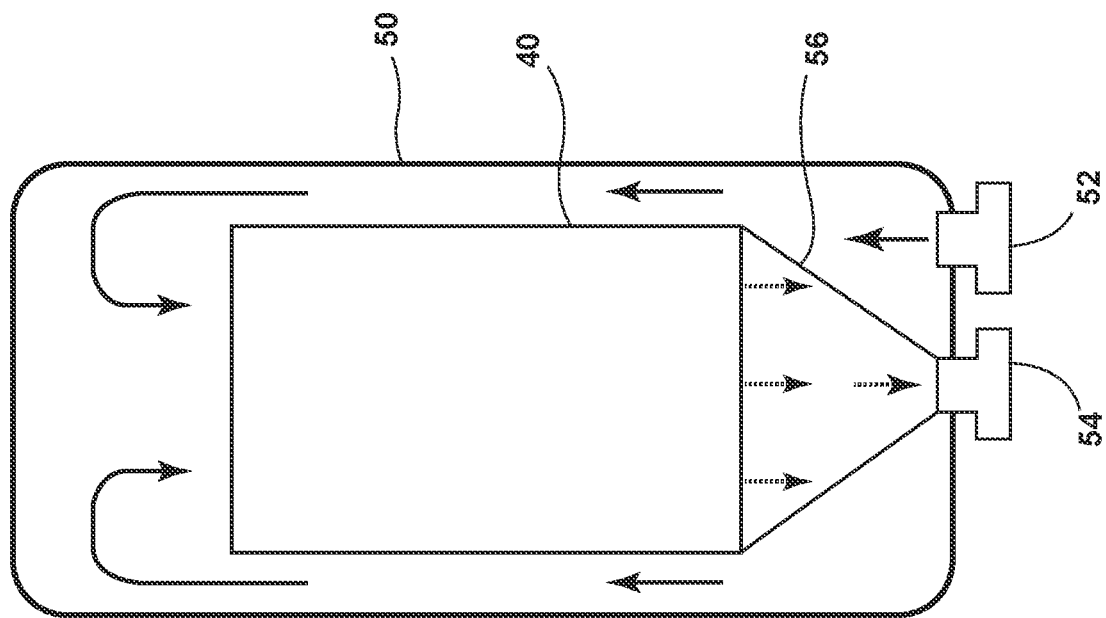
FIG. 6 illustrates an exemplary nuclear reactor for use with the nuclear fuel cladding of the current embodiments.

The foregoing fuel cans 12 can be used with a wide variety of cooling fluids, nuclear fuels, moderators, and core designs. As one example, the fuel cans 12 can be used with a He coolant, which is favored because He is chemically inert and has the ability to adopt more simple heat rejection systems without additional intermediate heat transfer loops. The fuel form can include conventionally fabricated $UO_2$ in hexagonal geometries to fit within the internal fuel cavity. The moderators can include a metal hydride moderator, for example yttrium hydride, which exhibits improved thermal stability over zirconium hydride. An optional core design is shown in FIG. 6. The reactor core 50 includes a core module 40, a coolant inlet 52, and a coolant outlet 54. The coolant inlet 52 and the coolant outlet 54 are located at the base of the reactor core 50. Coolant (e.g., He gas) moves along the exterior of the core module 40, passes through the cooling channels 18 of vertically stacked fuel cans 12, and is diverted to the outlet 54 by a baffle 56. Other core designs are also possible however, and the core design of FIG. 6 is merely presented for illustrative purposes.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A reactor comprising:
   a barrel; and
   a core module encapsulated within the barrel, the core module containing a plurality of fuel cans packed therein, each of the plurality of fuel cans comprising a fissile fuel and a cladding, the cladding comprising:
   a pair of walls formed from a first metal alloy as first and second nested hexagonal sleeves that are spaced apart from each other to form a channel configured to circulate a cooling gas during operation of the reactor, wherein the pair of walls includes an inner wall and an outer wall and is arranged and configured to encapsulate the fissile fuel and form a gap between the fissile fuel and the inner wall that is adjacent to the fissile fuel,
   first structures formed from a second metal alloy and extending into the channel, the first structures interconnecting the inner wall and the outer wall to sub-divide the channel into a plurality of cooling channels, the first structures being oriented at a non-zero angle relative to vertical to promote radial and axial movement of the cooling gas through the plurality of cooling channels, and second structures formed from a third metal alloy and extending toward the fissile fuel through the gap, the second structures including a plurality of vertical fins extending in a lengthwise direction along an inward-facing surface of the inner wall, the plurality of fins being oriented at an acute angle relative to the inward-facing surface of the inner wall, the plurality of fins being flexible to (i) comply to variations in size of the fissile fuel introduced during manufacturing or caused by operation of the reactor, (ii) improve heat transfer through the gap, and (iii) prevent collapse of the gap and strain on the pair of walls of the fuel can.

2. The reactor of claim 1, wherein the cooling gas circulated through the channel during operation of the reactor comprises He.

3. The reactor of claim 1, wherein the first metal alloy is Type 304 or Type 316 stainless steel.

4. The reactor of claim 1, wherein the first metal alloy is 316L stainless steel.

5. The reactor of claim 1, wherein the first metal alloy, the second metal alloy, and the third metal alloy comprise the same metal alloys.

6. The reactor of claim 1, wherein the first metal alloy, the second metal alloy, and the third metal alloy comprise at least two different metal alloys.

7. The reactor of claim 1, wherein the first metal alloy, the second metal alloy, and the third metal alloy each comprise a different metal alloy.

8. The reactor of claim 1, wherein the first metal alloy comprises stainless steel and wherein the third metal alloy comprises a copper alloy.

9. The reactor of claim 1, wherein the plurality of fins are rectangular and define a major edge and a minor edge, the major edge of the plurality of fins being joined to the inner wall.

* * * * *